(12) United States Patent
Yasui

(10) Patent No.: US 8,799,995 B2
(45) Date of Patent: Aug. 5, 2014

(54) IMAGE FORMING METHOD

(75) Inventor: Toru Yasui, Osaka (JP)

(73) Assignee: KYOCERA Document Solutions Inc. (JP)

( * ) Notice: Subject to any disclaimer, the term of this patent is extended or adjusted under 35 U.S.C. 154(b) by 799 days.

(21) Appl. No.: 12/698,849

(22) Filed: Feb. 2, 2010

(65) Prior Publication Data

US 2010/0251354 A1 Sep. 30, 2010

(30) Foreign Application Priority Data

Mar. 24, 2009 (JP) .................................. 2009-071242

(51) Int. Cl.
  *G06F 7/04* (2006.01)
  *G06F 21/78* (2013.01)
  *H04L 29/06* (2006.01)

(52) U.S. Cl.
  CPC .............. *H04L 63/102* (2013.01); *G06F 21/78* (2013.01); *H04L 63/0892* (2013.01)
  USPC ............................................... 726/3; 399/80

(58) Field of Classification Search
  CPC ... G03G 21/02; G03G 15/5016; H04N 1/344; H04N 1/346; H04L 63/0407–63/0421; H04L 63/08; H04L 63/0823; H04L 63/0892; H04L 63/10; H04L 63/102; G06F 21/30; G06F 21/31; G06F 21/33; G06F 21/335; G06F 21/60; G06F 21/608; G06F 21/6245; G06F 21/6254; G06F 21/6272; G06F 21/78

USPC ................... 726/5, 10, 2–3, 7; 713/155–156, 713/182–183; 709/201, 203, 217, 229; 707/781; 340/5.8–5.81; 705/18; 399/8, 399/79–80

See application file for complete search history.

(56) References Cited

U.S. PATENT DOCUMENTS

| | | | |
|---|---|---|---|
| 7,197,125 B1 * | 3/2007 | Prasad et al. | ............. 379/201.02 |
| 7,630,985 B2 * | 12/2009 | Sunada | ................... 1/1 |
| 7,748,028 B2 * | 6/2010 | Sato et al. | .......................... 726/5 |
| 7,757,271 B2 * | 7/2010 | Amdur et al. | ..................... 726/1 |
| 7,908,553 B2 * | 3/2011 | Kimura et al. | ................ 715/703 |
| 8,040,547 B2 * | 10/2011 | Ando | ........................... 358/1.15 |
| 8,132,230 B2 * | 3/2012 | Akita | .................................. 726/2 |
| 2001/0044894 A1 * | 11/2001 | Saito et al. | .................... 713/156 |
| 2001/0054142 A1 * | 12/2001 | Van Blarkom | ................ 713/151 |
| 2002/0042884 A1 * | 4/2002 | Wu et al. | ....................... 713/201 |
| 2003/0120610 A1 * | 6/2003 | Hamber | ......................... 705/67 |
| 2004/0130743 A1 * | 7/2004 | Nozato | ........................ 358/1.14 |

(Continued)

FOREIGN PATENT DOCUMENTS

| | | |
|---|---|---|
| JP | 2003-006162 | 1/2003 |
| JP | 2006200118 | 7/2006 |

(Continued)

*Primary Examiner* — Saleh Najjar
*Assistant Examiner* — Eric W Shepperd
(74) *Attorney, Agent, or Firm* — McDonnell Boehnen Hulbert & Berghoff LLP

(57) ABSTRACT

An image forming apparatus according to the present invention includes an authentication control unit configured to transmit authentication information including a login user name to an authentication server to cause the authentication server to perform authentication. When the authentication has been successful, the authentication control unit acquires user attribute information associated with the login user name from the authentication server. A job-history managing unit is configured to store the log information of a job in association with a display user name in the user attribute information.

7 Claims, 6 Drawing Sheets

(56) References Cited

U.S. PATENT DOCUMENTS

| | | | |
|---|---|---|---|
| 2004/0158737 A1* | 8/2004 | Lo et al. | 713/200 |
| 2005/0033659 A1* | 2/2005 | Zucker et al. | 705/26 |
| 2005/0033994 A1* | 2/2005 | Suzuki | 713/202 |
| 2005/0154574 A1* | 7/2005 | Takemura et al. | 703/22 |
| 2005/0188221 A1* | 8/2005 | Motsinger et al. | 713/201 |
| 2005/0216514 A1* | 9/2005 | Murata | 707/104.1 |
| 2006/0017951 A1* | 1/2006 | Tanaka | 358/1.13 |
| 2006/0184543 A1* | 8/2006 | Fukuta | 707/10 |
| 2006/0192990 A1* | 8/2006 | Tonegawa | 358/1.15 |
| 2007/0226776 A1* | 9/2007 | Tsugawa | 726/1 |
| 2007/0229873 A1* | 10/2007 | Kato | 358/1.14 |
| 2008/0005781 A1* | 1/2008 | Koga | 726/2 |
| 2008/0021933 A1 | 1/2008 | Ono | |
| 2008/0060070 A1* | 3/2008 | Uno | 726/21 |
| 2008/0178265 A1* | 7/2008 | Tsuchiya et al. | 726/3 |
| 2008/0307510 A1* | 12/2008 | Sakakibara | 726/4 |
| 2009/0037981 A1* | 2/2009 | Kino | 726/2 |
| 2009/0138939 A1* | 5/2009 | Kumar et al. | 726/1 |
| 2009/0158392 A1* | 6/2009 | Hughes et al. | 726/3 |
| 2009/0183243 A1* | 7/2009 | Ruppert et al. | 726/5 |
| 2011/0093719 A1* | 4/2011 | Duhaime et al. | 713/182 |

FOREIGN PATENT DOCUMENTS

| | | |
|---|---|---|
| JP | 2008-028753 | 2/2008 |
| JP | 2008-191857 | 8/2008 |
| JP | 2009-043018 | 2/2009 |

\* cited by examiner

| User Attribute Information | Contents |
|---|---|
| "cn" | Common Name (Full Name) |
| "displayName" | Display User Name |
| "givenName" | First Name |
| "sn" | Last Name |
| "Mail" | E-mail Address |
| "employeeNumber" | Employee Number |
| "facsimileTelephoneNumber" | Facsimile Telephone Number |
| "telephoneNumber" | Telephone Number |

Fig.4

Display User Name:

☐ cn  ☐ displayName  ☐ givenName

☐ sn  ☐ givenName+sn  ■ employeeNumber

E-mail Address:

■ Mail

Telephone Number:

☐ facsimileTelephoneNumber  ■ telephoneNumber

Fig.6

IMAGE FORMING METHOD

INCORPORATION BY REFERENCE

This application is based upon and claims the benefit of priority from the corresponding Japanese Patent Application No. 2009-071242, filed Mar. 24, 2009, the entire contents of which is incorporated herein by reference.

BACKGROUND OF THE INVENTION

1. Field of the Invention

The present invention relates to an image forming apparatus and an image forming system that store log information.

2. Description of the Related Art

In electronic devices, such as image forming apparatuses, user authentication is performed to identify an operator. When a job is executed after user authentication, a job execution history, etc. (log information) are stored in a file called a log.

In a known system in which authentication is performed independently for an image forming apparatus, rather than using a login user name for authentication, a display user name is stored in the image forming apparatus in association with the login user name that is recorded on the log. Thus, the login user name, which is important for security, can be protected.

However, in a system in which network authentication is performed at a server rather than at an image forming apparatus, no authentication information is present in the image forming apparatus. As a result, log information cannot be stored in the log using the display user name. Therefore, a login user name used in accessing the server is stored in the log, which poses a security problem.

In another known system for specifying a job executed by a user, a login user name or time/date at which the job was executed and a file name are stored in a log.

However, when a user who logs in to the system executes a job, the login user name is sometimes displayed and is sometimes not displayed in its log information. In the case where the login user name is not displayed, the job execution time/date and the file name are displayed. The case where the login user name is displayed has a serious security problem, while the case where the login user name is not displayed makes it difficult to identify the login user.

SUMMARY OF THE INVENTION

The present invention relates to an image forming apparatus and an image forming system that store log information. The image forming apparatus and the image forming system cause a user who logs in by network authentication to identify a job at higher security when the user executes the job.

An image forming apparatus according to a first embodiment of the present invention comprises an authentication control unit and a job-history managing unit. The authentication control unit is configured to transmit authentication information comprising a login user name to an authentication server to cause the authentication server to perform authentication, and when the authentication has been successful, to acquire user attribute information associated with the login user name from the authentication server. A job-history managing unit is configured to store the log information of a job using a display user name in the user attribute information.

The authentication control unit of the image forming apparatus according to this embodiment of the invention may be configured to transmit authentication information comprising a login user name to the authentication server to cause the authentication server to perform authentication, and when the authentication has been successful, to transmit the login user name to a lightweight directory access protocol (LDAP) server, and to acquire the user attribute information from the LDAP server.

An image forming system according to a second embodiment of the invention comprises an authentication server and an image forming apparatus connected through a network. The image forming apparatus comprises an authentication control unit configured to transmit authentication information comprising a login user name to the authentication server to cause the authentication server to perform authentication, and when the authentication has been successful, to acquire user attribute information associated with the login user name from the authentication server; and a job-history managing unit configured to store the log information of a job in association with a display user name in the user attribute information. The authentication server comprises a user-management control unit configured to perform authentication on the basis of the authentication information, to store the user attribute information associated with the login user name, and to transmit the user attribute information to the authentication control unit.

An image forming system according to a third embodiment of the invention comprises an authentication server, an LDAP server, and an image forming apparatus connected through a network. The image forming apparatus comprises an authentication control unit configured to transmit authentication information comprising a login user name to the authentication server to cause the authentication server to perform authentication. When the authentication has been successful, the authentication control unit transmits the login user name to the LDAP server in order to acquire user attribute information from the LDAP server. The image forming apparatus further comprises a job-history managing unit configured to store the log information of a job in association with a display user name in the user attribute information. The authentication server comprises a user-management control unit configured to perform authentication based on the authentication information, and when the authentication has been successful, to transmit a certificate to the authentication control unit. The LDAP server comprises an address-book management control unit configured to store the user attribute information associated with the login user name, and when the certificate is transmitted from the authentication control unit, to transmit the user attribute information to the authentication control unit.

BRIEF DESCRIPTION OF THE FIGURES

In the accompanying drawings:

FIG. 4 is a diagram of an example of user attribute information selected as a display user name in the image forming system of the second embodiment;

FIG. 6 is a diagram of an example of a user interface screen for selection of a display user name in the image forming system of the second embodiment.

DETAILED DESCRIPTION

First Embodiment

An image forming apparatus and an image forming system according to a first embodiment of the present invention will be described hereinbelow.

Figure 1:
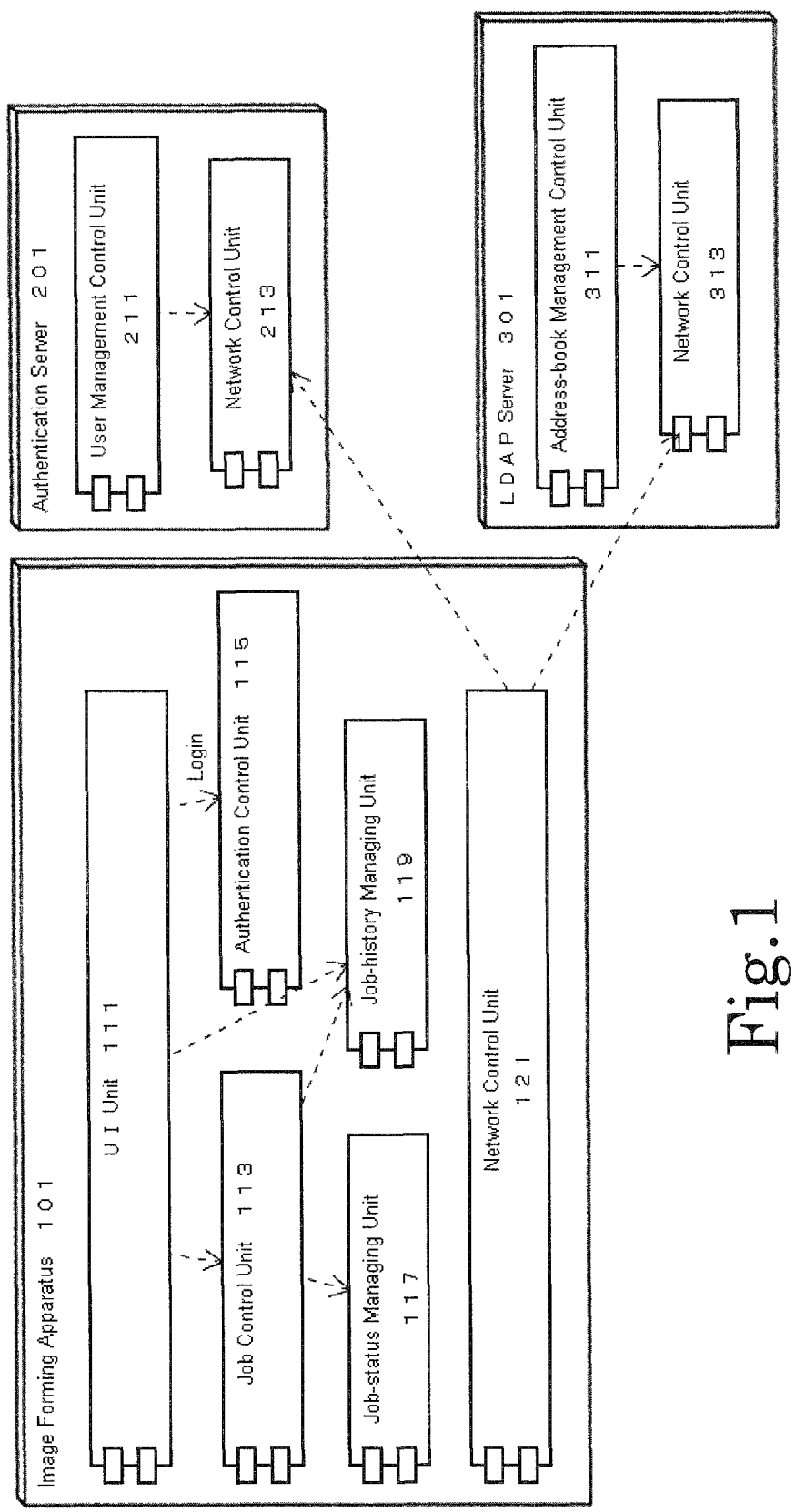
FIG. 1 is a block diagram of an image forming system according to a first embodiment of the present invention.

FIG. 1 is a block diagram of an image forming apparatus 101, an authentication server 201, and a lightweight directory access protocol (LDAP) server 301.

The image forming apparatus 101 includes a user interface (UI) unit 111, a job control unit 113, an authentication control unit 115, a job-status managing unit 117, a job-history managing unit 119, and a network control unit 121.

The UI unit 111 receives input from and provides output to the user. The UI unit 111 includes an output device, such as a display panel for displaying data for the user, and an input device, such as keys or a touch panel integrated with the display panel, for receiving input by the user.

The job control unit 113 controls the jobs of the image forming apparatus 101. The job control unit 113 receives operator instructions received by the UI unit 111 and executes the jobs indicated by the operator instructions.

The authentication control unit 115 requests the authentication server 201 to authenticate user's login requests that the UI unit 111 received. For example, WINDOWS (a graphical interface operating system) NT LAN Manager (NTLM) authentication, Kerberos authentication, or the like is used for the authentication.

The job-status managing unit 117 manages the statuses of the jobs that the job control unit 113 controls. The job-status managing unit 117 checks the statuses of the jobs and replies to inquiries about the job statuses from the other functional units (for example, the UI unit 111).

The job-history managing unit 119 stores the history of execution of the jobs as log information. The log information includes Job name, Job type, and Job owner name. The log information may further include Job starting time, Job ending time, and Job execution status. Job execution status includes information on whether the job ended normally or abnormally. If the job ended abnormally, Job execution status includes its error code or the like. A display user name (and not a login user name) is stored as job owner name.

The network control unit 121 communicates with the authentication server 201 and the LDAP server 301.

The authentication server 201 includes a user-management control unit 211 and a network control unit 213.

The user-management control unit 211 checks the login user name and a password stored in the user-management control unit 211 in response to a login authentication request using the login user name and the password from the image forming apparatus 101. If the login user name and the password match respectively, the authentication is successful. When the authentication is successful, a certificate is issued to the image forming apparatus 101 that sent the authentication request.

The network control unit 213 communicates with the image forming apparatus 101.

LDAP server 301 includes a directory service and responds to inquiries under the lightweight directory access protocol (LDAP) from the image forming apparatus 101. For example, Domino server for Notes, Exchange server for Outlook, or the like is used as the LDAP server 301.

The LDAP server 301 includes an address-book management control unit 311 and a network control unit 313.

The address-book management control unit 311 includes a directory service and acquires user attribute information from the directory service and responds to inquiries from the image forming apparatus 101. The user attribute information includes the display user name, an e-mail address, and a facsimile telephone number, for example. The address-book management control unit 311 responds to the inquiries only when the image forming apparatus 101 searches for the user attribute information with the certificate obtained from the authentication server 201.

By the above-described configuration including the authentication server 201 and the LDAP server 301, loading on the authentication server 201 and the LDAP server 301 is reduced. And the network authentication can be performed by the authentication server 201, even if the LDAP server 301 goes down. Furthermore, various kinds of attribute information can be acquired from an address book, which is edited easily and managed by a manager, in the Domino server for Notes or the Exchange server for Outlook.

Figure 2:
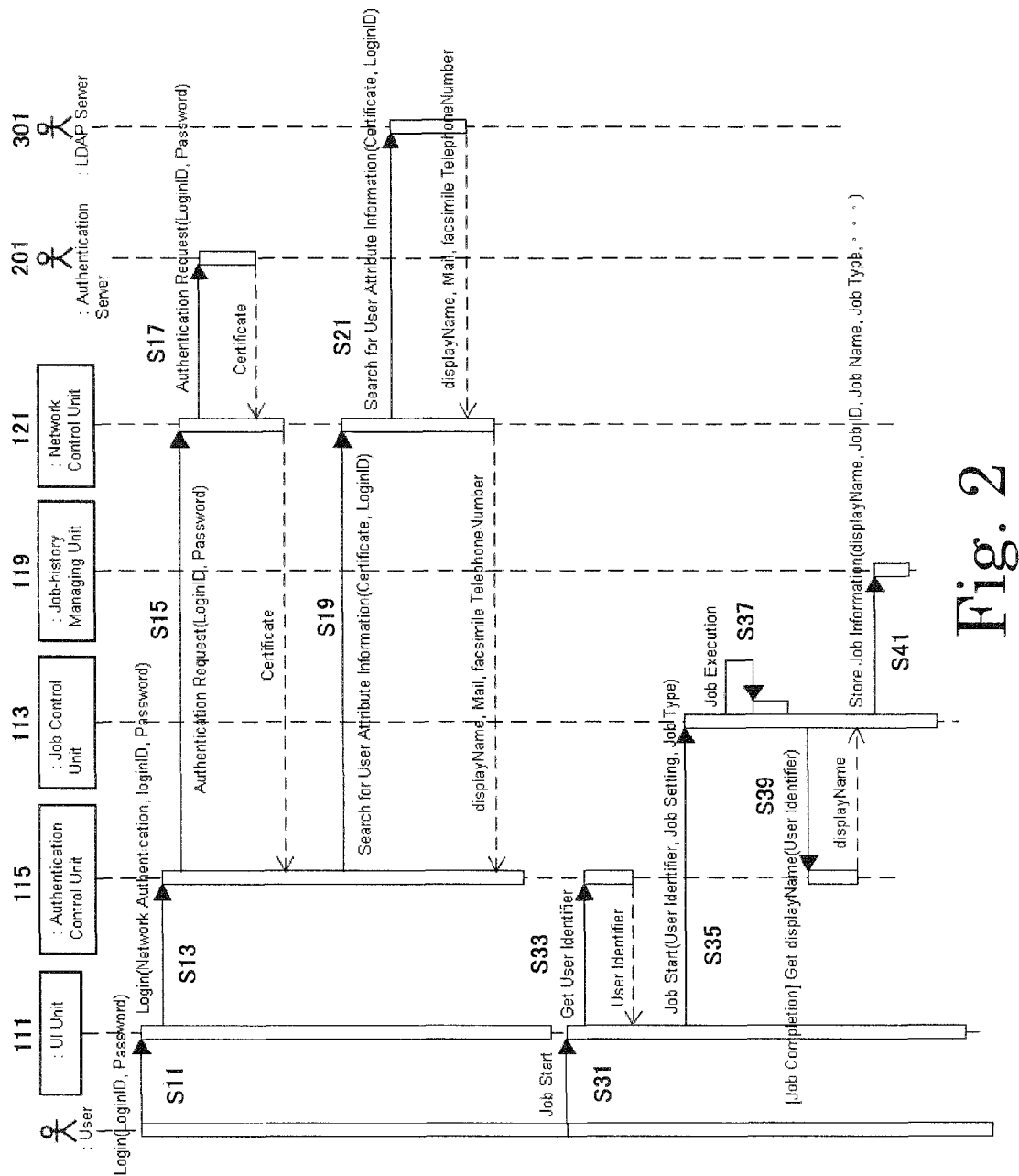
FIG. 2 is a sequence diagram showing the flow of the operation of the image forming system of the first embodiment.

FIG. 2 is a sequence diagram showing the flow of the operation of the image forming system of the first embodiment.

S11: A user who operates the UI unit 111 of the image forming apparatus 101 logs in to the image forming apparatus 101 by inputting authentication information ("LoginID" and "Password"). The "LoginID" represents the login user name. The UI unit 111 of the image forming apparatus 101 receives the input.

S13: The "LoginID" and the "Password" received in S11 are sent to the authentication control unit 115.

S15, S17: The authentication control unit 115 determines whether the system utilitizes network authentication or not. If network authentication is in use, the authentication control unit 115 transmits the "LoginID" and the "Password" to the authentication server 201 through the network control unit 121 to make an authentication request. If the authentication is successful, the authentication control unit 115 obtains a certificate from the authentication server 201 through the network control unit 121.

S19, S21: When the certificate is obtained from the authentication server 201, the authentication control unit 115 transmits the "LoginID" and the certificate to the LDAP server 301 through the network control unit 121 and searches for user attribute information. The authentication control unit 115 acquires the user attribute information from the LDAP server 301. The user attribute information includes a display user name ("displayName") and, for example, an e-mail address ("Mail") and a facsimile telephone number ("facsimileTelephoneNumber").

S31: The UI unit 111 of the image forming apparatus receives a job execution instruction ("Job Start") from the user.

S33: The authentication control unit 115 that received the "Job Start" instruction from the UI unit 111 creates a user identifier. In this system, the user identifier is temporarily created by the authentication control unit 115 on the basis of the "LoginID". The created user identifier is used instead of the login ID from this step forward, in order to enhance security of the login ID.

S35: The "Job Start" instruction on the UI unit 111 is sent to the job control unit 113 together with a job type, job setting, and the user identifier, for example.

S37: The job control unit executes the job.

S39: After completion of the job, the authentication control unit 115 acquires the "displayName" obtained in S21 on the basis of the user identifier.

S41: The job-history managing unit 119 stores log information, such as Job history. At that time, the display user name ("displayName"), rather than the login user name ("LoginID") or the user identifier is stored in the log information as information indicating the owner of the job. In addition, job ID, job name, job type, etc. are stored in the log information. Furthermore, job starting time, job ending time, job status, etc. may be stored in the log information.

Accordingly, the log information is stored in association with the display user name during network authentication; the login user name that is important for security is not stored. This enhances the security of the login user name. The login user name typically does not match an actual user name. Therefore, it is often difficult to determine the user based on the log information stored in association with the login user name. Since the log information is stored in association with the display user name, the owner of the job can be determined quickly.

After the login user name is used in the steps from S11 to S21, the user identifier created in S33 is used. This further enhances the security of the login user name.

Furthermore, loading on the authentication server and the LDAP server is reduced. In addition, the network authentication can be performed by the authentication server 201, even if the LDAP server 301 goes down. Finally, various kinds of attribute information can be acquired from the address book, which is edited easily and managed by the manager, in the Domino server for Notes or the Exchange server for Outlook.

Second Embodiment

An image forming apparatus and an image forming system according to a second embodiment of the present invention will be described herein below.

The image forming apparatus of the second embodiment includes functionality to cause the display user name to be selected from a plurality of the user attribute information, in addition to the functions described above for the image forming apparatus of the first embodiment.

In the first embodiment, the display user name is acquired from the directory service in the address-book management control unit 311 of the LDAP server 301. However, which user attribute information includes the display user name sometimes depends on the user environment. Thus, to identify which user attribute information to use as the display user name, the image forming apparatus of the second embodiment causes selection from the plurality of the user attribute information. This causes user attribute information suited to the user environment to be used.

Figure 3:
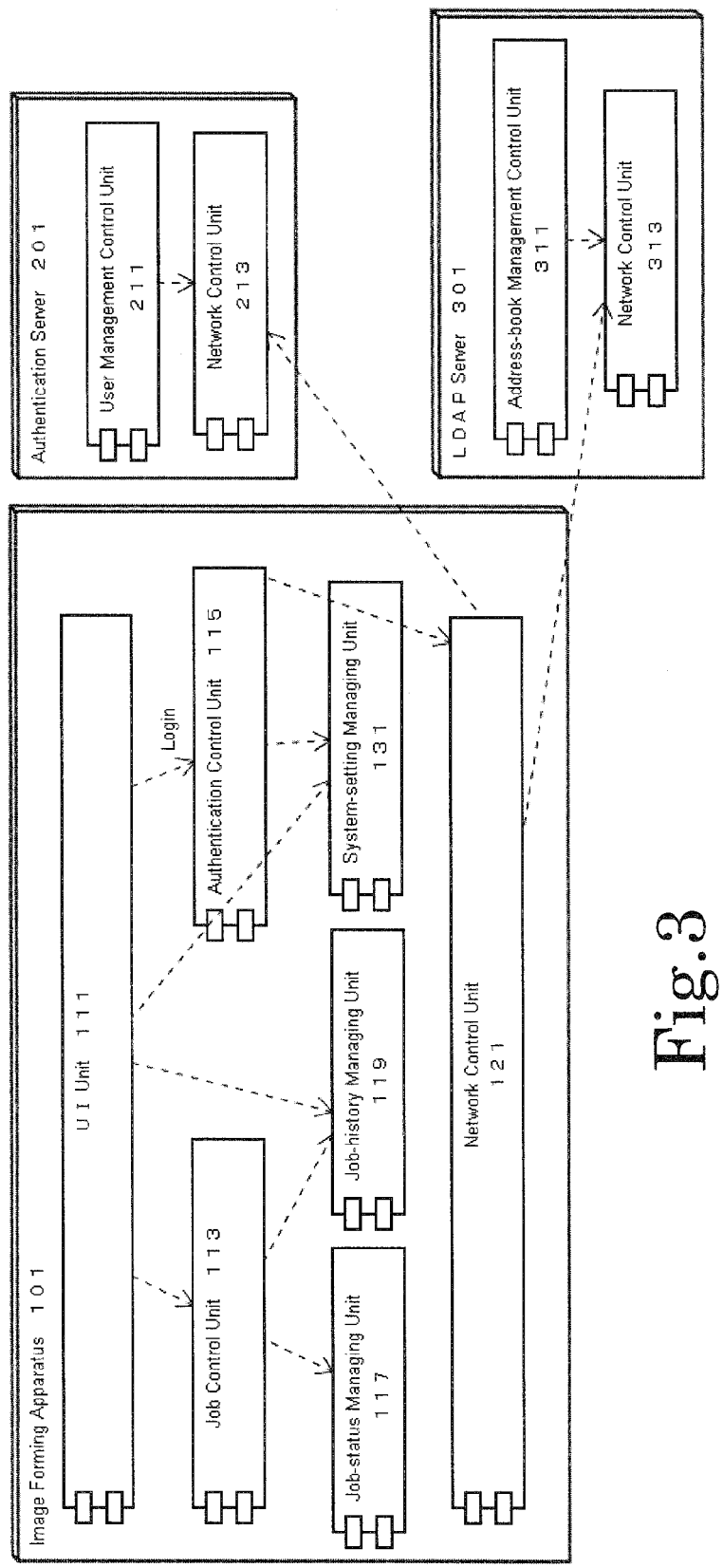
FIG. 3 is a block diagram of an image forming system according to a second embodiment of the present invention.

FIG. 3 is a block diagram of the image forming system of the second embodiment. The image forming apparatus 101 of the second embodiment includes a system-setting managing unit 131 in addition to the blocks shown in FIG. 1. The configuration of the second embodiment will become apparent from a description mainly about the function of the system-setting managing unit 131 and descriptions of the other functional blocks related thereto.

The system-setting managing unit 131 causes selection of the display user name to be stored in the log information from the user attribute information acquired from the LDAP server 301 at user authentication. This selection is performed by receiving an input from the user through the UI unit 111. FIG. 4 shows an example of the user attribute information selected as a display user name.

FIG. 6 shows an example of the user interface screen for selecting a display user name.

To select a display user name from the user attribute information shown in FIG. 4, a user marks a check box displayed on the side of the user attribute information in FIG. 6. In FIG. 6, an e-mail address ("Mail") and/or a telephone number ("facsimileTelephoneNumber" or "telephoneNumber") can be stored in the log information by marking the respective checkboxes. An employee number ("employeeNumber") is selected as the display user name, and the "Mail" and the "telephoneNumber" are stored in the log information.

Figure 5:
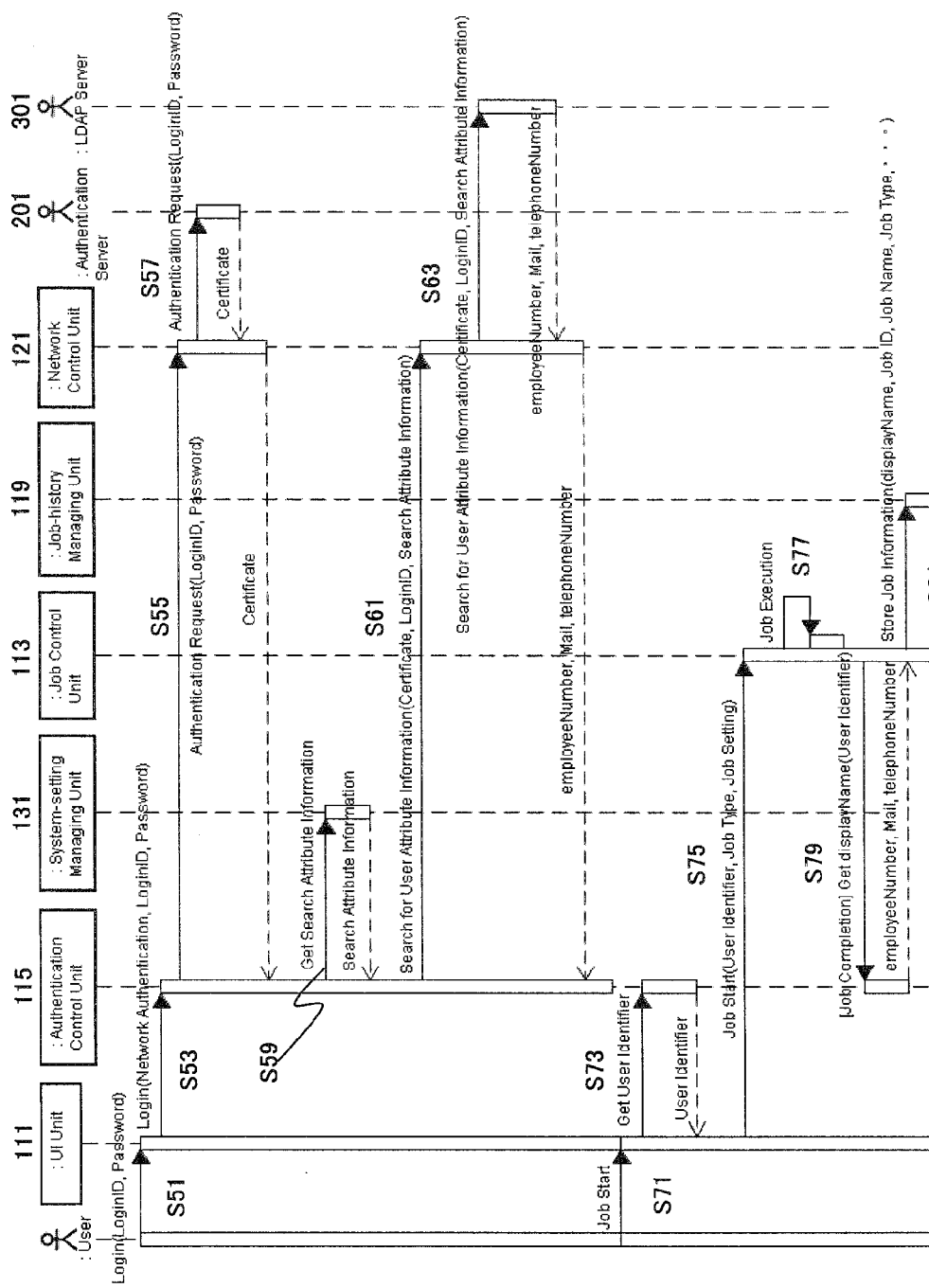
FIG. 5 is a sequence diagram showing the flow of the operation of the image forming system of the second embodiment.

FIG. 5 is a sequence diagram showing the operation flow of the image forming system of the second embodiment.

The flow of the operation from S51 to S57 is the same as the flow of the operation from S11 to S17 of the first embodiment shown in FIG. 2, so a description thereof will be omitted.

S59: The authentication control unit 115 acquires search attribute information from the system-setting managing unit 131. The search attribute information is the user attribute information selected as the display user name as shown in FIG. 4. At that time, a display user name candidate (that is, search attribute information) that is selected in advance by means of the user interface screen shown in FIG. 6 is stored in the authentication control unit 115.

S61, S63: If a certificate is acquired from the authentication server 201, the authentication control unit 115 transmits the "LoginID", the certificate, and the search attribute information to the LDAP server 301 through the network control unit 121 to search for the user attribute information. The authentication control unit 115 acquires the search attribute information from the LDAP server 301.

The flow of the operation from S71 to S77 is the same as the flow of the operation from S31 to S37 of the first embodiment shown in FIG. 2, so a description thereof will be omitted.

S79: The job-history managing unit 119 acquires the display user name candidate selected by the authentication control unit 115 in S59 to store log information, such as job history.

S81: The job-history managing unit 119 stores the log information in association with the display user name selected in S59.

The log information is stored in association with the display user name candidate selected in advance by means of the user interface screen.

This causes the user attribute information stored as the display user name to be set depending on the user selection. Thus, the log information is stored on the basis of information suited to the user environment, which improves convenience, such as in viewing the log information.

The present invention includes various other embodiments. For example, other designs can be used in which the above-described components are each performed.

While the storage of job history has been described in the embodiments of the invention, the invention may be applied to another log information, other than job history, such as authentication history.

In the embodiments of the present invention, the authentication server is divided into two. That is, there are the authentication server 201 for user authentication and the LDAP server 301 for storing the display user name. Alternatively, the authentication server 201 and the LDAP server 301 may be mounted on one server unit. As another alternative, the user-management control unit 211 of one authentication server may have the function of the address-book management control unit 313.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming method comprising:
    selecting, via a user interface of an image forming apparatus, search attribute information designating user attribute information types, including a display user name type;
    transmitting, via the image forming apparatus, authentication information comprising a login user name to an authentication server to cause the authentication server to perform authentication;
    transmitting, by the image forming apparatus, the search attribute information to the authentication server in response to the authentication being successful;
    acquiring, by the image forming apparatus, user attribute information associated with the login user name corresponding to the user information types designated by the search attribute information from the authentication server;
    registering, by the image forming apparatus, as a display user name the user attribute information corresponding to the display user name type designated by the search attribute information; and
    storing, in the image forming apparatus, log information of a job in association with the display user name, wherein the log information of the job is not stored in association with the login user name, and wherein after the authentication, the login user name is not stored in the image forming apparatus.

2. The image forming method according to claim 1, wherein the authentication server is a lightweight directory access protocol (LDAP) server.

3. The image forming method according to claim 2, wherein:
    the LDAP server comprises a directory service; and
    the user attribute information is acquired through the directory service.

4. The image forming method according to claim 2, wherein, in response to the authentication being successful, the login user name is transmitted to the LDAP server and the user attribute information designated by the search attribute information is acquired from the LDAP server.

5. The image forming method according to claim 1, wherein the user attribute information comprises at least one of a display name, an e-mail address, a facsimile telephone number, an employee number, and a telephone number.

6. The image forming method according to claim 1, wherein, after the authentication, a user identifier is created based on the login user name.

7. The image forming method according to claim 1, wherein the log information of the job comprises job-execution history information and job status information.

* * * * *